Feb. 9, 1971     G. WILAMOWSKI     3,562,773
UNIVERSAL GEOMETRICAL MEASURING INSTRUMENT
Filed Jan. 6, 1969     2 Sheets-Sheet 1
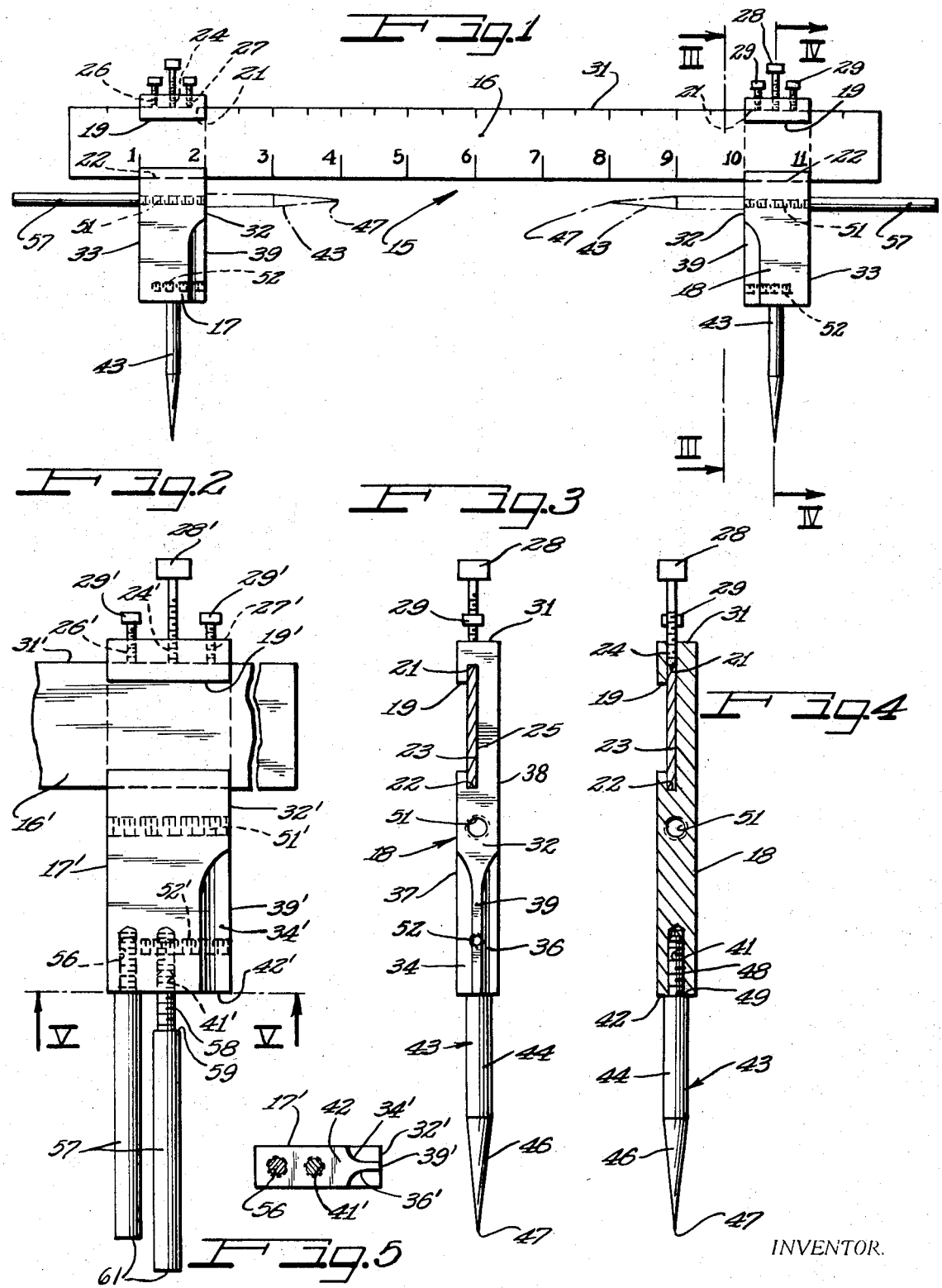
INVENTOR.
George Wilamowski
ATTORNEYS

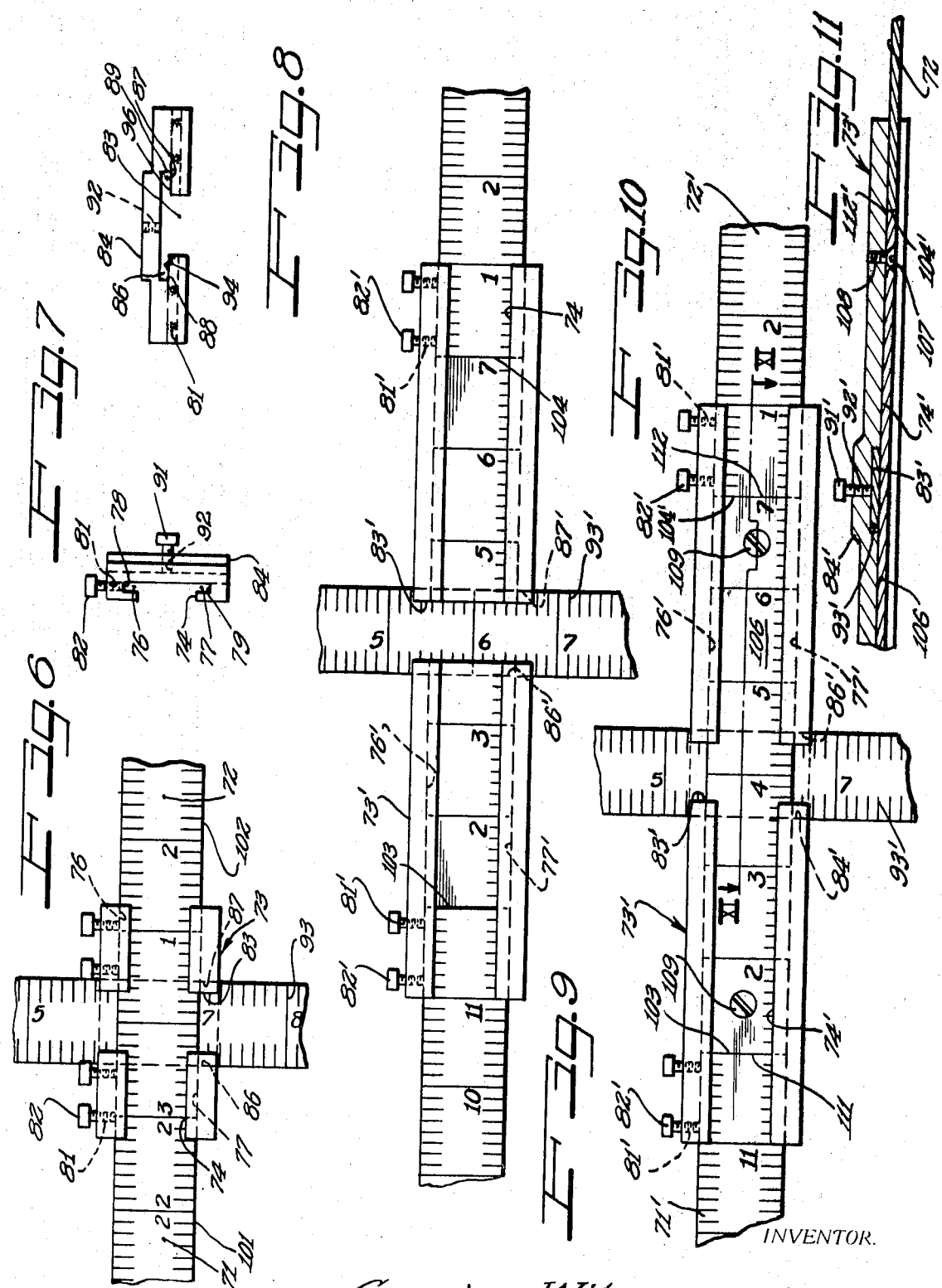

United States Patent Office 3,562,773
Patented Feb. 9, 1971

---

3,562,773
UNIVERSAL GEOMETRICAL MEASURING INSTRUMENT
George Wilamowski, 4818 Wegg,
East Chicago, Ind. 46312
Filed Jan. 6, 1969, Ser. No. 789,128
Int. Cl. G01b 5/00
U.S. Cl. 33—143                              2 Claims

---

ABSTRACT OF THE DISCLOSURE

A universal geometrical measuring instrument of the beam-trammel type adaptable to form opposed contact surfaces of various configurations to indicate dimensional distances between similar opposed surfaces of a variety of configurations formed on a workpiece to be measured. The measuring instrument includes a scale or beam having a pair of trammel blocks releasably secured thereto and slidable therealong. Each trammel block includes means forming at least a pair of apertures, with one aperture of the pair disposed normal to the other aperture, and means engageable with the apertures forming contact surfaces, indicating points and scribes to measure dimensional distances of surfaces having a variety of configurations, for example cylindrical surfaces, undercut groove portions, threads, slots and parallel surfaces. Also, means are provided for clamping two or more scales in a series arrangement to provide an extended scale to facilitate measuring exceptionally large workpieces.

BACKGROUND OF THE INVENTION

Field of the invention

This invention relates generally to geometrical measuring instruments and more particularly refers to a unitary distance measuring instrument of the beam-trammel type having means forming various configured opposed surfaces for contacting opposed surfaces of a variety of configurations formed on a workpiece to be measured.

Brief description of the prior art

Beam-trammel type measuring instruments have been proposed heretofore although each of these prior art devices have been specifically designed to perform a single measuring function.

A machininst in the course of performing his function will be called upon to accurately determine a variety of dimensional properties of a machined workpiece, for example outside diameters of cylindrical objects, inside diameters of cylindrical apertures, major and minor diameters of both internal and external threads, distances between parallel surfaces, minor diameters of circumferential grooves, maximum distance between opposed, undercut grooves, depth of a blind aperture and distances from an edge to a point on a workpiece. No one prior art measuring instrument of the beam-trammel type is capable of indicating all of the hereinabove mentioned measurements. Therefore, a machinist necessarily uses several separate and distinct measuring instruments to ascertain these various measurements.

A beam-trammel geometrical measuring instrument is particularly adaptable to measuring extremely large workpieces. To form a scale having a length of several feet, several smaller scales are usually connected together in a series arrangement. Various means for clamping together adjacent scales have been proposed heretofore, although none of these prior art devices have provided the rigidity necessary to prevent an exceptionally long series of scales from sagging at juncture points between adjacent scales, and thus, indicating an inaccurate measurement.

SUMMARY OF THE INVENTION

In accordance with the present invention, a beam-trammel type geometrical measuring instrument is provided with a pair of trammel blocks adaptable for receiving cylindrical pins or tapered scribes in a variety of positions to equip the instrument for measuring opposed surfaces of a variety of configurations. Briefly described, the trammel block constructed in accordance with the present invention includes an elongated bar member having a rectangular cross-section and formed with a slot recessed along one side thereof to receive a scale. Each block is formed with at least one planar side edge disposed normal to a longitudinal axis of the scale for alignment with markings on the scale to indicate a dimensional measurement. Each trammel block also includes at least a pair of threaded apertures, with a first aperture disposed concentrically of a longitudinal axis of the trammel block and normal to the longitudinal axis of the scale and with a second aperture disposed normal to the first aperture and extending parallel to the longitudinal axis of the scale. Each trammel block may additionally include a third threaded aperture parallel to and disposed beneath the second aperture.

With a tapered scribe engaged into the first aperture of each trammel block, the instrument may be used as a beam compass or for measuring distance between two points. Also, with a scribe engaged into either the second aperture or the third aperture of each trammel block the instrument may be used for measuring a minor diameter of a thread or the distance between opposed, peripheral grooves. By utilizing the third aperture, additional "throat depth" is provided for the measuring instrument, where necessary, as compared to utilization of the second apertures.

The trammel block may also be provided with a fourth aperture extending parallel to the first aperture. When it is desired to measure a distance from an edge of a workpiece, a pair of cylindrical pins are inserted into the parallel first and fourth apertures of one trammel block with one pin extending below the other to form a pair of staggered pins for engaging the edge of the workpiece to be measured.

It is also contemplated by the present invention to provide a clamp means for securing a series of scales together to form an extended scale to be used for measuring extremely large workpieces. The clamp means constructed in accordance with the present invention includes an elongated bar like member having a slot formed in one side thereof with opposed, undercut grooves spaced apart a distance slightly greater than the standard width of a scale. The clamp means also includes four thumb screws threadedly engaged into apertures formed in the bar member and spaced so that two thumb screws engage each end portion of adjacent scales. In this manner, adjacent scales are securely clamped together to prevent bending at the juncture between adjacent scales. Additionally, the clamp means may include a second slot normal to the first slot and recess therebelow. The second slot also includes undercut grooves for receiving a standard scale which is clamped in position by a thumb screw threaded through a bottom wall of the slot and engaging a face of the scale. This second slot permits forming a crossed arrangement of scales which may be utilized as a depth gage or for locating a center point of a circle.

Accordingly, it is a primary object of the present invention to provide a unitary beam-trammel type measuring instrument having a configuration to permit adaptation thereof for measuring distances between opposed surfaces having a variety of configurations.

BRIEF DESCRIPTION OF THE DRAWINGS

In the accompanying drawings, forming a part of this specification and in which like reference characters are employed to designate like parts throughout the same:

FIG. 1 is an elevational view of a beam-trammel type measuring instrument embodying the features of the present invention;

FIG. 2 is a partial elevational view of a trammel block constructed according to an alternative embodiment of the present invention;

FIG. 3 is a transverse sectional view taken along line III—III of FIG. 1;

FIG. 4 is a transverse sectional view taken along line IV—IV of FIG. 1;

FIG. 5 is a sectional view taken along line V—V of FIG. 2;

FIG. 6 is a side elevational view of a clamping device embodying the principles of the present invention;

FIG. 7 is an end view of the clamping device shown in FIG. 6;

FIG. 8 is a top plan view of the clamping device;

FIG. 9 is a side elevational view of a clamping device constructed in accordance with an alternative embodiment of the present invention;

FIG. 10 is a side view of a clamping device constructed in accordance with another alternative embodiment of the present invention; and FIG. 11 is a sectional view taken generally along line XI—XI of FIG. 10.

DESCRIPTION OF THE PREFERRED EMBODIMENTS

Referring to the drawings, and first particularly referring to FIGS. 1 through 5, inclusive, there is shown a beam-trammel type measuring instrument generally designated at 15. The measuring instrument 15 generally includes a scale or graduated rule 16 and a pair of trammel blocks 17 and 18 slidably secured to the scale.

In accordance with the principles of the present invention, each trammel block 17 or 18 includes an elongated bar member having a rectangular cross section and characterized by a recess 19 formed in a side wall thereof at one end portion of the trammel block and normal to a longitudinal axis thereof. The recess 19 is characterized by a pair of opposed, undercut grooves 21 and 22, spaced apart a distance to fittingly receive the scale 16 having a standard one inch width. The recess 19 has a backwall 23 formed to be coplanar with a longitudinal axis of the trammel block so that one face of the scale 16 lies along a longitudinal axis of the trammel block 17 or 18.

Each trammel block 17 or 18 also has three threaded apertures 24, 26 and 27 formed in an uppermost portion thereof to intersect the undercut groove 21. A large thumb screw 28 threadedly engages the centrally disposed aperture 24, while a pair of smaller thumb screws 29, 29 flank the larger thumb screw 28 and threadedly engage the apertures 26 and 27. The small thumb screws 29, 29 are threaded into the apertures 26 and 27 to lightly contact an upper edge 31 of the scale 16 to hold the trammel blocks 17 and 18 normal to a longitudinal axis of the scale, while permitting the trammel blocks to slide along the scale. To lock the trammel blocks 17 and 18 at a desired position along the scale 16, the large thumb screw 28 is threaded into the aperture 24 until the upper edge 31 of the scale is tightly engaged thereby.

It is contemplated by the present invention, that each trammel block 17 or 18 be provided with at least one planar, ground surface 32 extending along an edge thereof. Desirably, the elongated bar members forming the trammel blocks 17 and 18 also have a second ground, planar edge 33 opposed to the planar edge 32 and spaced therefrom a distance equal to a dimensional unit, for example one inch. The planar edge 32 is characterized by a pair of bevelled surfaces 34 and 36 tapering inwardly from opposed sidewalls 37 and 38 of the trammel blocks 17 or 18 to form a relatively narrow contact surface 39. Trammel block 18 differs from trammel block 17 only in that the narrow contact surface 39 of one trammel block is disposed on an edge opposite to that of the other trammel block so that with the trammel blocks 17 and 18 secured to the scale 16, as illustrated in FIG. 1, the narrow contact surfaces 39, 39 project toward each other while the face 25 of the scale 16 lies along the longitudinal axis of each trammel block.

With the narrow contact surfaces 39, 39 of the trammel blocks 17 and 18 projecting toward each other, the measuring instrument 15 may be used as a caliper for measuring distances between parallel surfaces or for measuring an outside diameter of a cylindrical object. When used as a caliper, the dimensional distances indicated on the scale 16 by the planar surfaces 32, 32 is determined by substracting the dimensional units indicated by surface 32 of trammel 17 from the dimensional units indicated by surface 32 of trammel 18. Furthermore, the width of an aperture may also be measured by reversing the disposition of the trammel blocks 17 and 18 so that the contact surfaces 39, 39 project outwardly.

Also, in accordance with the present invention, each trammel block 17 or 18 is provided with a blind, threaded aperture 41 opening from a lower edge 42 and positioned concentrically of the longitudinal axis of the trammel block and normal to the longitudinal axis of the scale 16. A tapered scribe 43 is threaded into each aperture 41 to adapt the instrument 15 to perform the functions of a beam compass. Each scribe 43 is formed of an elongated cylindrical member having a body portion 44 and a tapered end portion 46 terminating a sharp point 47. Each scribe 43 also has a reduced end portion 48 formed opposite the tapered portion 46 and threaded to be engageable with the threaded aperture 42. The reduced portion 48 also forms an annular shoulder 49 on the scribe 43 to abut against the lower edge 42 for positively positioning the scribe 43 within the trammel blocks 17 and 18.

With the scribe 43, 43 threaded into the apertures 41, 41 of the trammel blocks 17 and 18, the instrument 15 forms a beam compass which may be used to scribe an arc or circle on a workpiece or to measure distances between line segments or points on a workpiece. Desirably, the trammel blocks 17 and 18 are formed with the planar edges 32 spaced from the planar edges 33 precisely one inch, and with this spacing, the distance between the tapered points 47, 47 of the scribes 43, 43 is directly indicated on the scale 16 by substracting the units indicated by the planar edge 33 of the trammel 17 from the units indicated by the planar edge 32 of the trammel 18.

Furthermore, it is contemplated by the present invention to provide at least one additional aperture 51 passing through the trammel blocks 17 and 18 normal to the longitudinal axis thereof and opening at the planar edges 32 and 33. As illustrated in phantom in FIG. 1, scribes such as the scribes 43 may be threaded into the apertures 51, 51 of the pair of trammel blocks 17 and 18 in a manner to project toward one another. With this arrangement, the instrument 15 may be used as a thread gauge or used to indicate distances between opposed grooves formed on a periphery of a workpiece.

The disposition of the scribes 43, 43 in the apertures 51, 51 may be reversed, i.e., may be disposed to project outwardly of the scale 16, and in this configuration the instrument 15 is adapted for measuring distances between opposed, undercut grooves formed within an aperture for functioning as a thread gauge for internally formed threads.

The position of the aperture 51 may be moved downwardly toward the lower end portion of the trammel block to provide a measuring instrument having an increased throat depth for use with large workpieces, or an additional aperture 52 may be provided parallel to aperture 51 and spaced downwardly therefrom. The additional aperture 52 may be a blind aperture, as illustrated in the drawings, or the same may extend entirely through the trammel block. The function and usage of the aperture is substantially identical to that of aperture 51, but due to the positioning of aperture 51 near the scale 16, this aperture is better adapted for storing the pins 57 and scribes 43.

A machinist is often required to measure a distance from an edge of a workpiece, and in the form of the invention illustrated in FIGS. 2 and 5 at least one of the trammel blocks is provided with a means for engaging an edge of a workpiece which permits accurate measurements therefrom. In this embodiment of the invention, a trammel block 17' is provided with an additional threaded aperture 56 opening inwardly from a downwardly projecting surface 42' and disposed parallel to and spaced from the threaded aperture 41' which is formed concentrically of a longitudinal axis of the trammel block. In other respects, the trammel block 17' is the same as the trammel block 17 as described hereinabove so like parts are identified with like numerals to which a prime has been added.

The edge engaging means also includes a pair of cylindrical pins 57, 57 each characterized by a reduced diameter portion 58 forming an annular shoulder 59. The reduced diameter portion 58 is externally threaded for engagement into the apertures 41' or 56. The distance from the shoulder 59 to the lowermost end 61 of each pin 57 is equal to the distance from the shoulder 49 of the tapered scribe to the point 47 thereof. Thus, as illustrated in FIG. 2, with one of the pins 57 threaded into the aperture 56 so that the shoulder 59 thereof seats against the lower end 42' of the trammel block and with the other pin 57 threaded into the aperture 41' a lesser extent so that a lowermost end portion thereof extends below the lowermost end portion of the other pin, the pins cooperate to form an offset portion for engaging an edge of a workpiece. Since the enlarged cylindrical portion of each pin 57 is of the same length as the body portion 44 plus the tapered end portion 46 of the scribe 43, the pin 57 engaged into the aperture 56 will contact the surface containing the point to be measured so that the scale 16' will be held parallel to the surface containing the point to be measured, thereby assuring an accurate measurement of the distance from the edge of the workpiece to the point. In determining the measurement from the edge of the workpiece to a point thereon, the radial dimension of the pin 57 disposed within the aperture 41' must be taken into consideration.

A beam-trammel measuring instrument such as instrument 15 illustrated in FIGS. 1 through 5, is particularly applicable to measuring extremely large workpieces, for example large castings or forgings requiring various machining operations to form a finished product. Castings and forgings of this nature often have dimensions of several feet, therefore it may be necessary to form the scale 16 of several interconnected one-foot or two-foot long scales.

It is contemplated by the present invention to provide a means for securely clamping together a pair of individual scales.

As illustrated in FIGS. 6, 7 and 8, a pair of adjacently disposed scales 71 and 72 are clamped together by clamping means indicated generally at 73. The clamping means 73 includes an elongated bar member having a first slot 74 formed along a sidewall thereof and characterized by a pair of opposed, undercut grooves 76 and 77. The undercut grooves 76 and 77 are respectively formed with bottom wall portions 78 and 79 spaced apart a distance equal to the width of the scale 71 and 72. The standard machinist scale used in the United States is generally formed with a width exactly equal to one inch, therefore the spacing between the bottom walled portions 78 and 79, respectively of the undercut grooves 76 and 77, are desirably spaced apart a distance slighlty greater than one inch. Thus, the clamping means 73 forms a channel into which an end portion of a scale such as 71 or 72 may be slidably received.

The clamping means 73 has four threaded apertures as at 81 formed through an upper wall portion thereof and opening into the undercut groove 76. The four apertures 81 are longitudinally spaced apart so that two of the apertures overlie an end portion of each of the scales 71 and 72 when both scales are inserted an equal distance into the channel formed in the clamping means.

Four thumb screws, as at 82, are threaded into the apertures 81 to tightly engage the scales 71 and 72, thereby to securely clamp or lock the scales into the clamping means 73. Desirably, the clamping means should have a longitudinal length to accept at least one inch of each scale 71 and 72. This one-inch overlap and the close fitting relationship between the undercut grooves 76 and 77 provide a clamping means which prevents an elongated scale composed of a series of clamped together scales from bending or sagging at juncture points between adjacent scales.

Additionally, in accordance with the principles of the present invention, the clamping means 73 has a second slot 83 formed transversely of the first slot 74 and recessed therebelow into an offset portion 84. The second slot 83 also includes undercut grooves 86 and 87 formed normal to the first slot 74 and having bottom wall portions 88 and 89 respectively. The bottom wall portions 88 and 89 of the undercut grooves 86 and 87 are spaced apart a distance to receive a standard one-inch scale.

Clamping means are provided by a thumb screw 91 which threads through an aperture 92 formed laterally through the offset portion 84 to intersect the second slot 83. The thumb screw 91 engages a face of a scale, such as scale 93, as shown in FIG. 6, and clamps the scale against the side walls 94 and 95, respecively of the undercut grooves 86 and 87.

With the scale 93 properly inserted and claimped into the slot 83 and with the scale 71 and 72 properly clamped into the slot 74, the clamping means provides a depth gauge. To utilize the depth gauge formed by the clamping means 73, the scales 71 and 72 are positioned with an edge surface, such as 101 and 102, respectively, thereof engaging a peripheral surface surrounding a blind aperture to be measured, and the thumb screw 91 is loosened to permit the scale 93 to slide within the slot 83. The scale 93 is inserted into the blind aperture until an end portion thereof securely engages a bottom wall of the blind aperture to be measured. The thumb screw 91 may then be tightened and the scales and clamping means removed from the aperture. The depth of the blind aperture will be directly indicated on the scale 93 by either edge surface 101 and 102 of the scales 71 and 72.

The crossed arrangement of scales provided by the clamping means 73 also provides an instrument for readily ascertaining the center point of a circular aperture or a scribed circle on a workpiece. In this application, the scale 93 is positioned with its midpoint, for example the six-inch marking, aligned with the longitudinal axis of the scales 71 and 72. The clamping means and scales are then positioned so that the four outwardly extending arm portions provided by the scales intersect the circular aperture or scribed circle to be measured at an equal distance from the center of a square defined by overlapping portions of the scales. With the scales and the clamping means so arranged, a scribe mark is made on the workpiece precisely adjacent opposed side edges of each arm portion provided by the scales, due to the one-inch width of a standard scale, the markings provide two sets of aligned pairs of markings precisely one inch apart. A pair of lines scribed precisely midway between the two sets of aligned pairs of markings will intersect at the center of the circle. A center of a circle determined by using the clamping means 73 and associated scales is sufficiently accurate for most machining operations on large workpieces.

In the form of the invention shown in FIGS. 9 through 11, an extended clamping means is provided to permit joining together a pair of scales for forming an extended scale having a length greater than the sum of the pair of scales. In other respects, the clamping means are the same as already described so like parts are identified with like numerals to which a prime has been added.

As illustrated in FIGS. 9 and 10 the clamping means 73' includes an elongated bar like member having a longitudinal length to permit a one-inch overlap between opposed end portions of the bar member and each of the scales 71' and 72' while providing a six-inch spacing between adjacent end portions of the pair of scales. In assembling an extended scale utilizing the clamping means, as illustrated in FIG. 9, the scale 71' is slidably inserted into the opposed, undercut grooves 76' and 77' until an outer end edge as at 103 aligns with a marking disposed approximately one inch inwardly of an edge of the member 73'. In a like fashion, the scale 72' is slidably inserted into the opposed end portion of the clamp 73' until an outer end edge 104 thereof aligns with a marking disposed approximately one inch inwardly of the other end portion of the member 73'. As thus assembled, the adjacent end portions of the scale 71' and 72' are spaced apart a distance equal to exactly six inches, although the clamping means 73' may be formed to provide any convenient spacing between the opposed end portions of adjacent scale.

It is also contemplated by the present invention that a positive stop may be provided against which the opposed end portion of adjacent scales 71' and 72' may abut to assure precise spacing therebetween. As illustrated in FIGS. 10 and 11 such a positive stop may be provided by a scale 106 slidably inserted into the channel formed by the opposed undercut grooves 76' and 77'. The scale 106 is of a length to provide a clear area within the channel of the member 73' at opposed end portions thereof for permitting the scale 71' and 72' to be inserted into the bar member 73' in a overlaping relationship therewith.

The scale 106 and the bar member 73' are each provided with a pair of complementary apertures as at 107 and 108 passing therethrough with the apertures 107 of the bar member being threaded and the apertures 108 of the scale being countersunk. A pair of flat-head bolts 109, 109 are inserted through the countersunk apertures 108 of the scale 106 and threaded into the apertures 107 formed in the bar member 73', thereby to secure the scale in position within the bar member 73'.

In assembling an extended scale utilizing the clamping means including the scale 106, the scales 71' and 72' are slidably inserted into opposite end portions of the channel formed in the clamp 73' until the end portions 103' and 104', respectively, of the scales 71' and 72', abut against opposite end portions 111 and 112 of the scale 106.

Although minor modifications might be suggested by those versed in the art, it should be understood that I wish to embody within the scope of the patent warrented hereon all such modifications as reasonably and properly come within the scope of my contribution to the art.

I claim as my invention:

1. A universal measuring instrument comprising:
scale graduated into dimensional units by a multiplicity of equally spaced markings formed thereon;
a pair of trammel blocks attached to said scale, each said block including,
an elongated bar member having a recess formed along a side thereof normal to a longitudinal axis of said bar for receiving said scale.
at least one planar edge surface disposed normal to a longitudinal axis of said scale for alignment with said markings to indicate a dimensional measurement,
means releasably securing said blocks to said scale,
means forming a first aperture disposed concentrically of a longitudinal axis of said bar member and normal to the longitudinal axis of said scales, and
means forming a second aperture disposed parallel to a longitudinal axis of said scale and normal to said first aperture;
means engageable with said apertures forming projecting members providing contact surfaces for engaging similar opposed points or surfaces of a variety of configurations formed on a workpiece to be measured;
one block of said pair of trammel blocks further including means forming a third aperture disposed parallel to and spaced from said first aperture; and
means engageable with said third aperture forming a projecting member cooperating with said projecting member in said first aperture in said one block with one said projecting member extending below the other member to define an offset for engaging an edge formed on the workpiece to be measured, one of said projecting members being coextensive with another projecting member disposed on the other block of said pair of trammel blocks and providing a contact surface.
whereby said scale will be disposed parallel to a surface of the workpiece to be measured and measurements will be indicated on said scale.

2. A universal measuring instrument comprising:
a scale graduated into dimensional units by a multiplicity of equally spaced markings formed thereon;
a pair of trammel blocks mounted on said scale, each said block including,
a bar member having a recess formed therein for receiving said scale,
means releasably securing said block to said scale,
a pair of spaced planar edge surfaces extending normal to a longitudinal axis of said scale and across a face surface thereof for alignment with said markings to indicate dimensional measurements,
means forming a first aperture disposed concentrically of an axis extending parallel to said pair of edge surfaces and disposed midway therebetween, and
means forming a second aperture disposed parallel to a longitudinal axis of said scale and normal to said first aperture; and
means engageable with said apertures formed on one block of said pair of trammel blocks and forming projecting members providing contact surfaces for engaging points or surfaces formed on a workpiece to be measured,
means engageable with said apertures formed on the other one of said trammel blocks and forming an offset portion for engaging an edge on a workpiece to be measured and having a surface for engaging said workpiece formed coextensive with a corresponding surface on one of said projecting members engaged in said one of said trammel blocks,
whereby the dimensional distances between the opposed surfaces or points is directly indicated on said scale by reading markings aligned with said planar edge surfaces.

References Cited

UNITED STATES PATENTS

| | | | |
|---|---|---|---|
| 364,913 | 6/1887 | Emery | 33—164 |
| 1,219,141 | 3/1917 | Nelson | 33—159 |
| 2,512,235 | 6/1950 | Lankford | 33—158 |
| 1,321,312 | 11/1919 | Jooss | 33—158 |

LEONARD FORMAN, Primary Examiner

C. E. PHILLIPS, Assistant Examiner

U.S. Cl. X.R.

33—158